(12) United States Patent
Wuerthele et al.

(10) Patent No.: US 10,040,397 B1
(45) Date of Patent: Aug. 7, 2018

(54) SPLIT CONSOLE LID AND ARMREST IN BOTH OPEN AND CLOSED POSITIONS

(71) Applicant: Toyota Motor Engineering & Manufacturing North America, Inc., Erlanger, KY (US)

(72) Inventors: Stuart R. Wuerthele, Saline, MI (US); Cristian Farcas, Novi, MI (US); Benjamin David Jimenez, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/710,291

(22) Filed: Sep. 20, 2017

(51) Int. Cl.
*B60R 7/04* (2006.01)
*B60N 2/46* (2006.01)
*B60N 2/75* (2018.01)
*B60R 11/00* (2006.01)

(52) U.S. Cl.
CPC .............. *B60R 7/04* (2013.01); *B60N 2/4686* (2013.01); *B60N 2/793* (2018.02); *B60K 2350/925* (2013.01); *B60R 2011/0007* (2013.01); *B60R 2011/0014* (2013.01)

(58) Field of Classification Search
CPC .......... B60R 7/04; B60N 2/4686; B60N 2/793
USPC ..................................................... 296/24.34
See application file for complete search history.

(56) References Cited

U.S. PATENT DOCUMENTS

| 6,616,205 B2 | 9/2003 | Bruhnke et al. |
| 7,740,299 B2* | 6/2010 | Reischer ................... B60R 7/04 |
| | | 224/275 |
| 8,100,454 B2 | 1/2012 | D'Alessandro et al. |
| 8,925,989 B2 | 1/2015 | Appelboum et al. |
| 9,162,627 B2 | 10/2015 | Greiner et al. |
| 9,457,696 B2 | 10/2016 | Dyle |
| 2006/0113811 A1* | 6/2006 | Tanaka ...................... B60R 7/04 |
| | | 296/24.34 |
| 2009/0066102 A1* | 3/2009 | Shiono ..................... B60R 7/04 |
| | | 296/24.34 |

FOREIGN PATENT DOCUMENTS

FR      2877615 B1     5/2006

* cited by examiner

*Primary Examiner* — Joseph D. Pape
(74) *Attorney, Agent, or Firm* — Christopher G. Darrow; Darrow Mustafa PC

(57) ABSTRACT

A split center console assembly includes a front end wall, a rear end wall, and first and second opposing side walls, each cooperating to define a storage compartment. The assembly includes a split cover for selectively providing access to the storage compartment. The split cover includes a pivoting driver armrest and a pivoting passenger armrest. Each armrest includes an upper support surface configured to provide arm support when the split center console assembly is in a closed position, a side edge support surface configured to provide an arm support when the split center console assembly is in an open position, and a lower surface. At least one pivot hinge is provided, defining an arm portion extending a distance from a pivot axis and configured to pivotally couple the respective armrest to the storage compartment. In various aspects, each pivot axis is offset a distance from the side walls.

16 Claims, 4 Drawing Sheets

SPLIT CONSOLE LID AND ARMREST IN BOTH OPEN AND CLOSED POSITIONS

TECHNICAL FIELD

The present disclosure generally relates to center console assemblies, and more particularly, to a split console lid that provides an armrest functionality in both open and closed positions.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Vehicle center console assemblies often provide a dual purpose. First, they provide a storage compartment for small or delicate objects. Second, when closed they may function as an armrest for the driver and front seat passengers. Split console lids provide an added benefit in that if one of the front seat occupants wants to access the storage compartment, this can be accomplished by opening one half of the cover, while the other half can remain closed if it is being used as an armrest by another occupant. In certain instances, however, it may be desirable to provide continuous access to the storage compartment, while at the same time still have an available armrest for use. In most instances with a split center console, when the side is in the open state, that side is raised so high that it can no longer function as an armrest.

Accordingly, it would be desirable to provide an improved center console assembly. Specifically, it would be beneficial to have a console assembly that can function as an armrest while in an open position as well as in the closed position.

SUMMARY

This section provides a general summary of the disclosure, and is not a comprehensive disclosure of its full scope or all of its features.

In various aspects, the present teachings provide a split center console assembly for a vehicle. The split center console assembly includes a front end wall, a rear end wall, and first and second opposing side walls, each cooperating to define a storage compartment. The assembly includes a split cover for selectively providing access to the storage compartment. The split cover includes a pivoting driver armrest and a pivoting passenger armrest. Each armrest generally includes an upper support surface configured to provide arm support when the split center console assembly is in a closed position, a side edge support surface configured to provide an arm support when the split center console assembly is in an open position, and a lower surface. At least one pivot hinge is provided for each armrest, defining an arm portion extending a distance from a pivot axis and configured to pivotally couple the respective armrest to a top of the storage compartment.

In other aspects, the present teachings provide a split center console assembly for a vehicle. The split center console assembly includes a front end wall, a rear end wall, and first and second opposing side walls, each cooperating to define a storage compartment. The assembly includes a split cover for selectively providing access to the storage compartment. The split cover includes a pivoting driver armrest and a pivoting passenger armrest. Each armrest generally includes an upper support surface configured to provide arm support when the split center console assembly is in a closed position, a side edge support surface configured to provide an arm support when the split center console assembly is in an open position, and a lower surface defining a shaped recess to accommodate rotational movement of each armrest with respect to an adjacent side wall. A pair of spaced apart pivot hinges are provided for each armrest, each pivot hinge is configured to pivotally couple the armrest to a pivot axis located at the respective front end wall and the rear end wall of storage compartment. Each pivot axis may be offset a distance from the side walls. In various aspects, each pivot hinge defines an arm portion extending from the pivot axis. An edge of the arm portion of each pivot hinge may define a rest stop configured to abut against an upper edge of a respective side wall in the open position.

In still other aspects, the present teachings provide a split center console assembly for a vehicle providing substantially equal armrest heights in open and closed positions. The split center console assembly includes a front end wall, a rear end wall, and first and second opposing side walls, each cooperating to define a storage compartment. The assembly includes a split cover for selectively providing access to the storage compartment. The split cover includes a pivoting driver armrest and a pivoting passenger armrest. Each armrest generally includes an upper support surface configured to provide arm support when the split center console assembly is in a closed position, a side edge support surface configured to provide an arm support when the split center console assembly is in an open position, and a lower surface defining a shaped recess to accommodate rotational movement of each armrests with respect to an adjacent side wall. Each armrest may further include a base support member, and a pair of spaced apart pivot hinges coupled to the base support member. The pivot hinges may be configured to pivotally couple the armrest to the respective front end wall and the rear end wall storage compartment. The arm support from the upper support surface and the arm support from the side edge support surface is provided at substantially the same height when the split center console assembly is in the respective closed and open positions.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides an improved center console assembly for a vehicle. In particular, the present technology provides a center console assembly with a split console lid, or split cover, with two pivoting armrests that can function as an armrest when the console assembly is in either the closed position or the open position. Each armrest may include a set of pivot hinges coupled to the console, each rotatable about a pivot axis. The pivot hinges may include an extending arm portion, and the pivot axes may be offset a distance from the sides of the console such that when pivoted, or rotated, side end portions of the armrests are able to drop down to a lower position, with each armrest resting adjacent the respective side of the console. In this regard, the armrests are provided with an upper support surface that serves as an arm support in the closed position, and a side support surface, substantially perpendicular to the upper support surface, that serves as an arm support in the open position.

Figure 1:
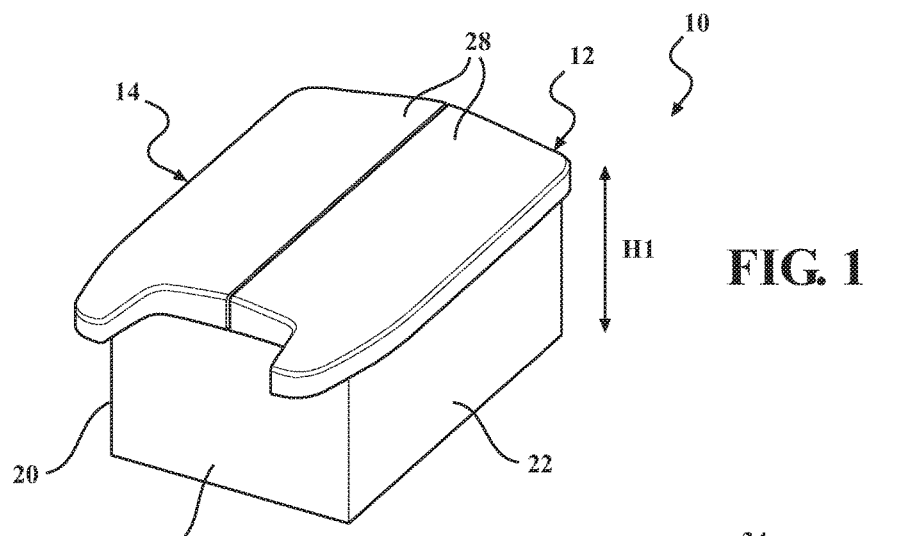
FIG. 1 is a perspective view of a split center console assembly according to various aspects of the present technology.
Figure 2:
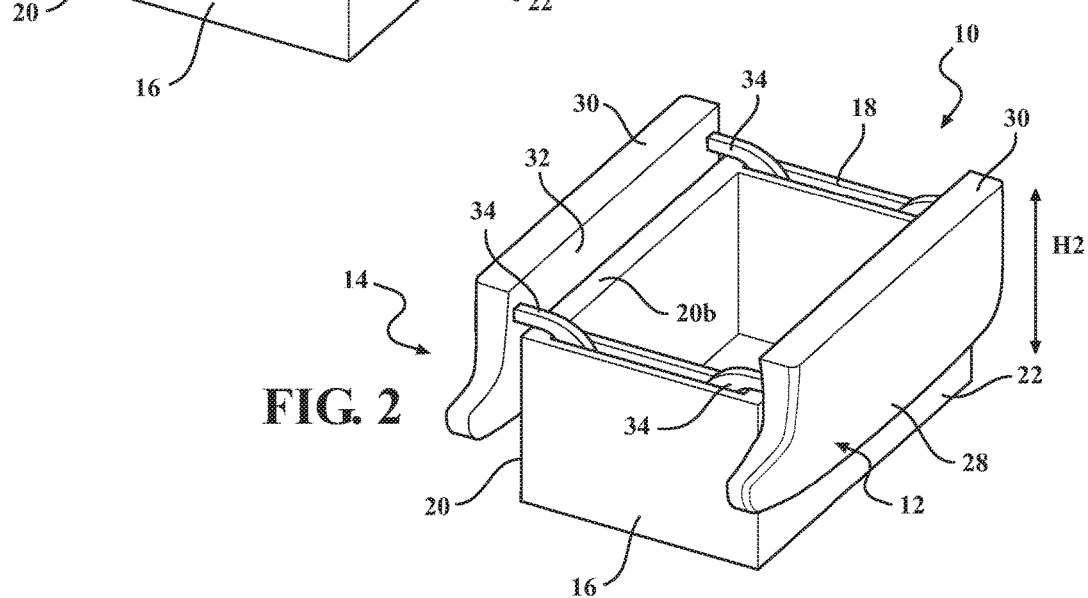
FIG. 2 is a perspective view of the split center console assembly of FIG. 1 with a driver armrest and a passenger armrest pivotally rotated in an open position.
Figure 7A:
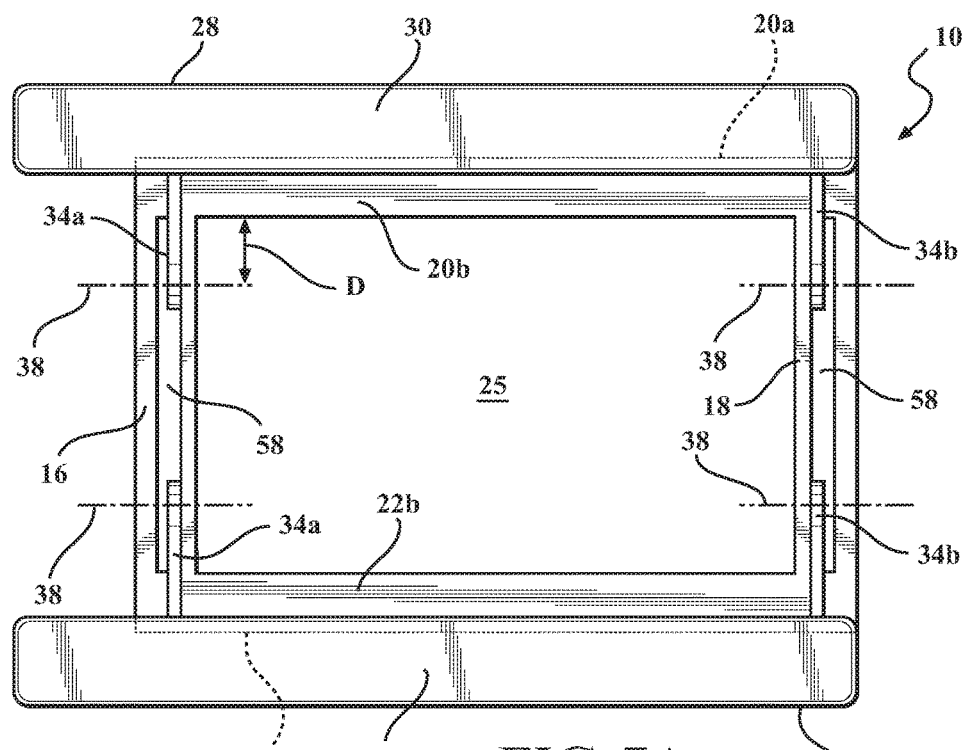
FIG. 7A is a top plan schematic view of the split center console in the open position, illustrating a location of the pivot hinges according to a first aspect.
Figure 7B:
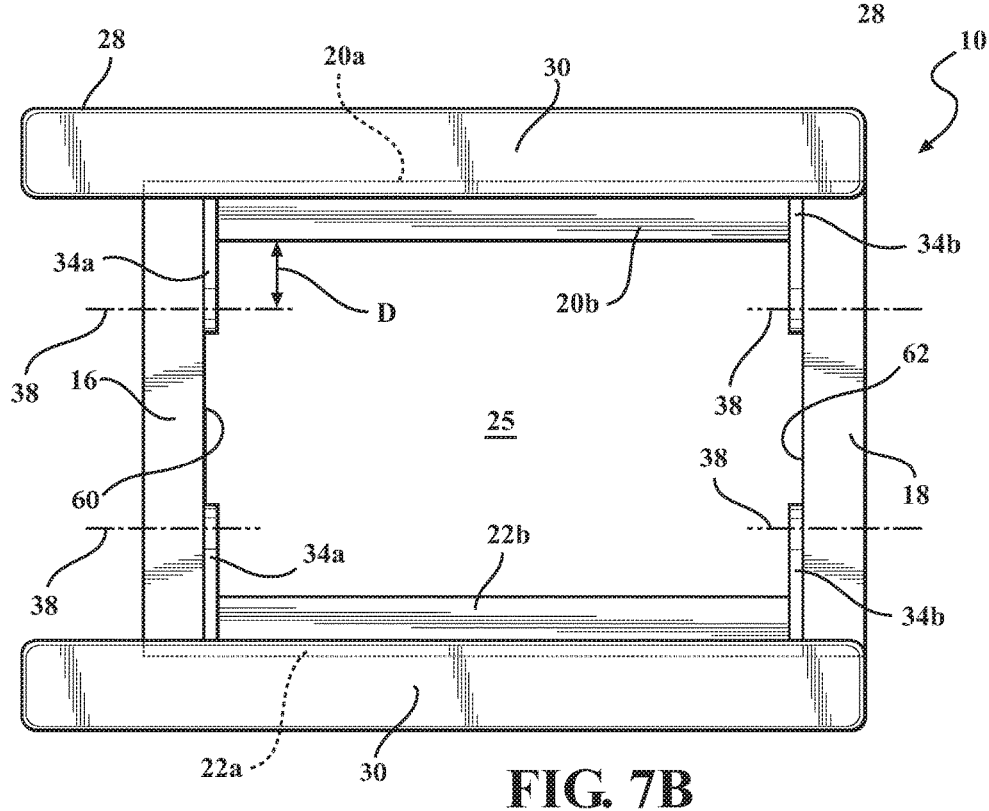
FIG. 7B is a top plan schematic view of the split center console in the open position, illustrating the location of the pivot hinges according to a second aspect.

With reference to the various figures, FIG. 1 is a perspective view of a split center console assembly 10, according to various aspects of the present technology, in a closed position. FIG. 2 is a perspective view of the split center console assembly 10 of FIG. 1 with both a driver armrest 12 and a passenger armrest 14 pivotally rotated in an open position. The driver armrest 12 and passenger armrest 14 are preferably movable independent from one another. Locking mechanisms and release levers (not shown) for one or both of the armrests 12, 14 may be provided as desired. The split center console assembly 10 generally includes a front end wall 16, a rear end wall 18, and first and second opposing side walls 20, 22, each cooperating to define an enclosed cavity configured for use as storage compartment 24. A bottom wall 25 may also be provided, as best shown in FIGS. 7A and 7B. The interior or exterior of front, rear, side, or bottom walls may be shaped or slightly curved, although the storage compartment 24 is generally rectangular in cross section. The various components that cooperate to define the storage compartment 24 may comprise a plastic or resin to provide suitable strength and structural support. Various components of the assembly 10 may also be metal reinforced. In aspects where the storage compartment is heated or cooled, appropriate insulating materials may be useful.

As illustrated in FIGS. 1 and 2, each armrest 12, 14 may include an upper support surface 28 configured to provide arm support for an occupant when the split center console assembly 10 is in a closed position, a side edge support surface 30 configured to provide an arm support for an occupant when the split center console assembly 10 is in an open position, and a lower surface 32. At least one pivot hinge 34 is provided for each armrest 12, 14, defining an arm portion 36 extending a distance from a pivot axis 38 (as best shown in FIGS. 6-7) and configured to pivotally couple the respective armrest 12, 14 to the storage compartment 24. The armrests 12, 14 may be padded for occupant comfort. The various exterior surfaces 28, 30, 32 may comprise the same or different materials. Exemplary material selections may include fabrics, textiles, leathers, and the like, of various grades, styles, and colors. The materials used with the exterior surfaces may be patterned, stamped, and provided with stitching, textures, and designs as may be desired.

Figure 3:
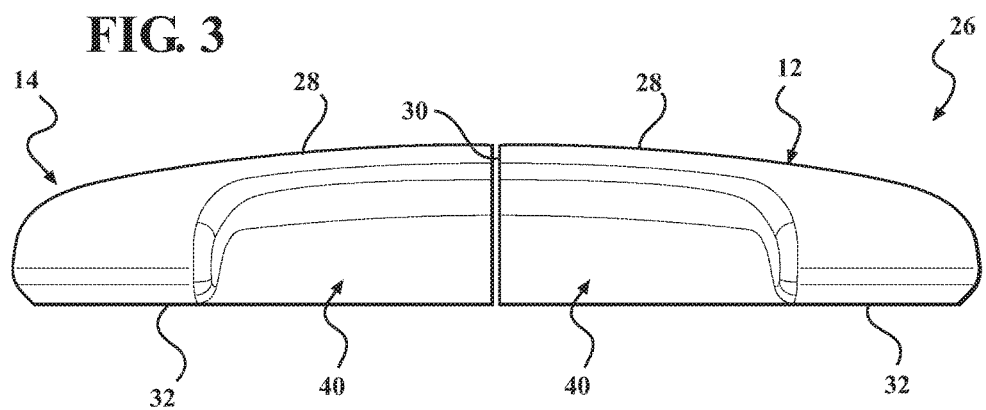
FIG. 3 is a front plan view of an exemplary split cover portion of the console assembly of FIG. 1.

As discussed above, the assembly 10 includes a split cover 26 for selectively providing access to the storage compartment for stowing various items. The split cover 26 can be defined as collectively including the pivoting driver armrest 12 and the pivoting passenger armrest 14. FIG. 3 provides a front plan view of an exemplary split cover 26 useful with the split center console assembly 10 of FIG. 1. At least one or both of the driver armrest 12 and the passenger armrest 14 may define a grip portion 40 that is shaped and configured for assisting an occupant to grasp and rotate the respective armrest 12, 14. The grip portions 40 may define a suitable recess or scalloped region shaped and configured for gripping by an occupant's hand or a plurality of fingers.

Figure 4:
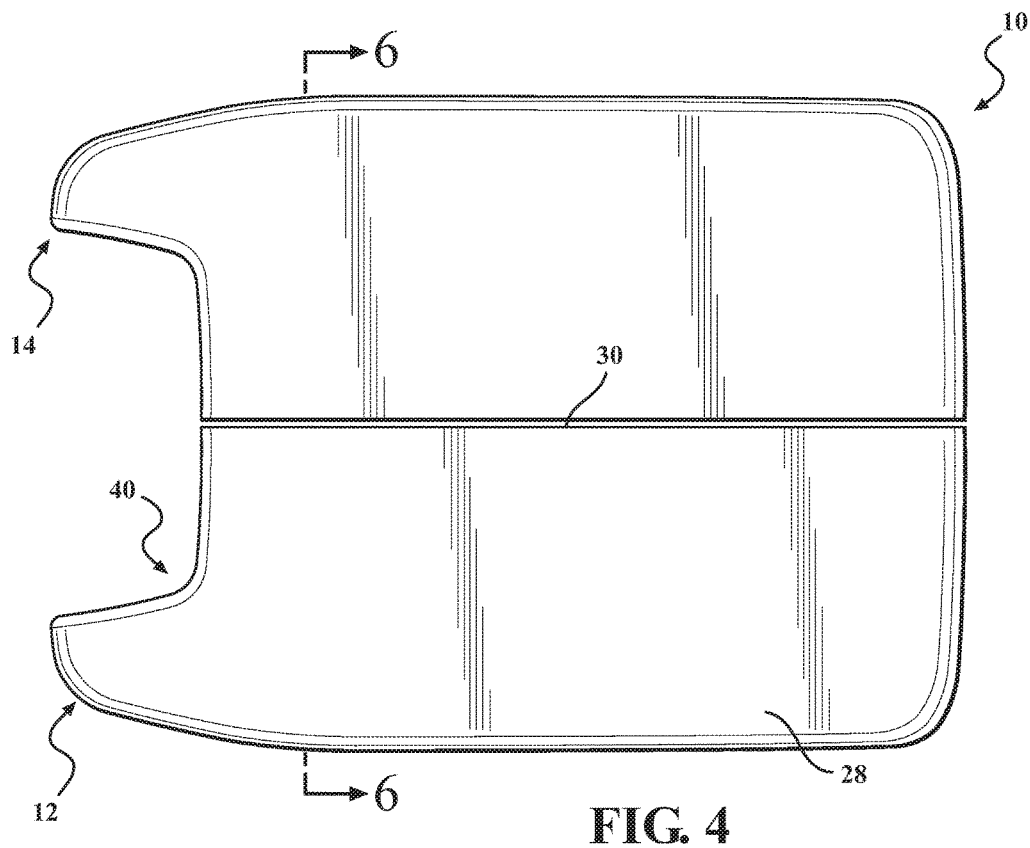
FIG. 4 is a top plan view of the split center console assembly of FIG. 1.

FIG. 4 is a top plan view of the split center console assembly 10 of FIG. 1. As shown, the several corner regions and edges may be rounded, shaped, and designed with various ergonomic considerations. While generally planar, the top surface 28 may be slightly curved for added aesthetics or comfort.

Figure 5:
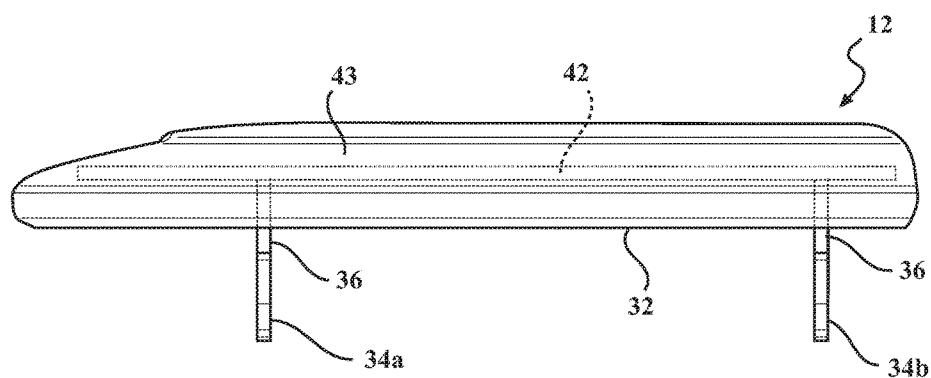
FIG. 5 is a side plan view of a pivoting driver armrest and pair of pivoting hinges, including a base support member in phantom view.

FIG. 5 is a side plan view of an exemplary pivoting driver armrest 12 that includes a pair of spaced apart pivot hinges 34a, 34b coupled thereto for coordinated rotational movement about a plurality of pivot axes 38. As will be described in more detail below, the pivot hinges 34a, 34b may be spaced apart such that they are adjacent the front end wall 16 and the rear end wall 18, respectively. In various aspects, a base support member 42 may be coupled to the armrests 12, 14, and optionally extend a length of the armrest, provided as a main support or backbone of the armrests 12, 14. The base support member 42 may comprise any structural material sufficient for its purpose of providing a desired level of rigidity to the armrest 12, 14. The base support member 42 may be coupled to an exterior surface or exterior portion of the armrest 12, 14, or may be partially or fully encapsulated within a center region of the armrest. In one example, the base support member 42 may be surrounded by a foam material 43, padding, or the like, that is then surrounded by a material that defines the outer surfaces 28, 30, 32. In certain aspects, the base support member 42 may be integrally formed with one or both of the pivot hinges 34, as a single, monolithic component. In other aspects, the base support member 42 may be removably coupled to the armrests using various mechanical fastening techniques.

Figure 6A:
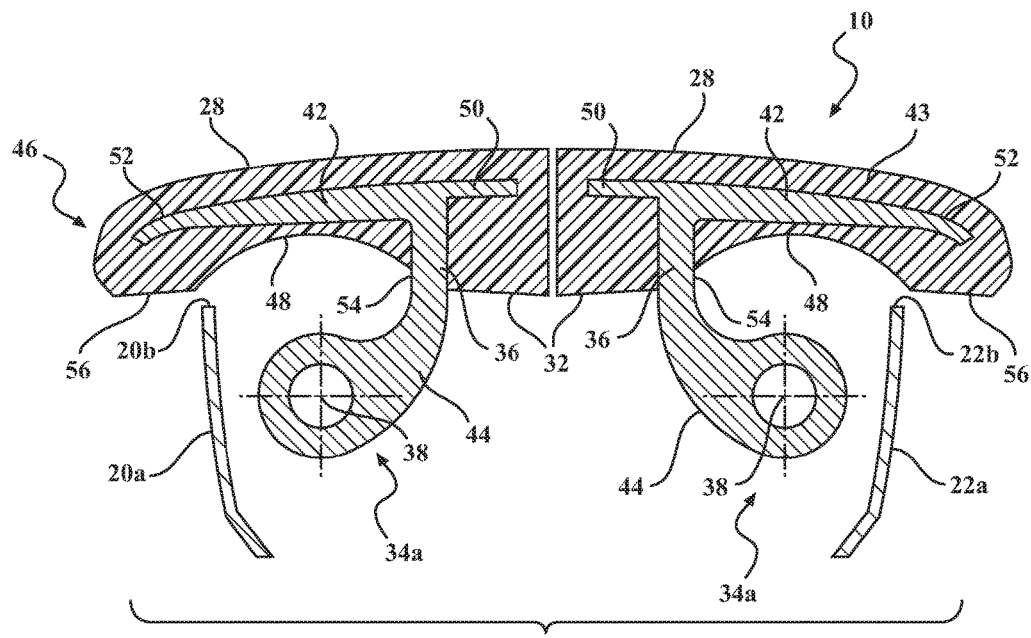
FIG. 6A is a partial cross-sectional view of the split center console taken along the line 6-6 of FIG. 4, with the split center console assembly in a closed position as shown in FIG. 1.
Figure 6B:
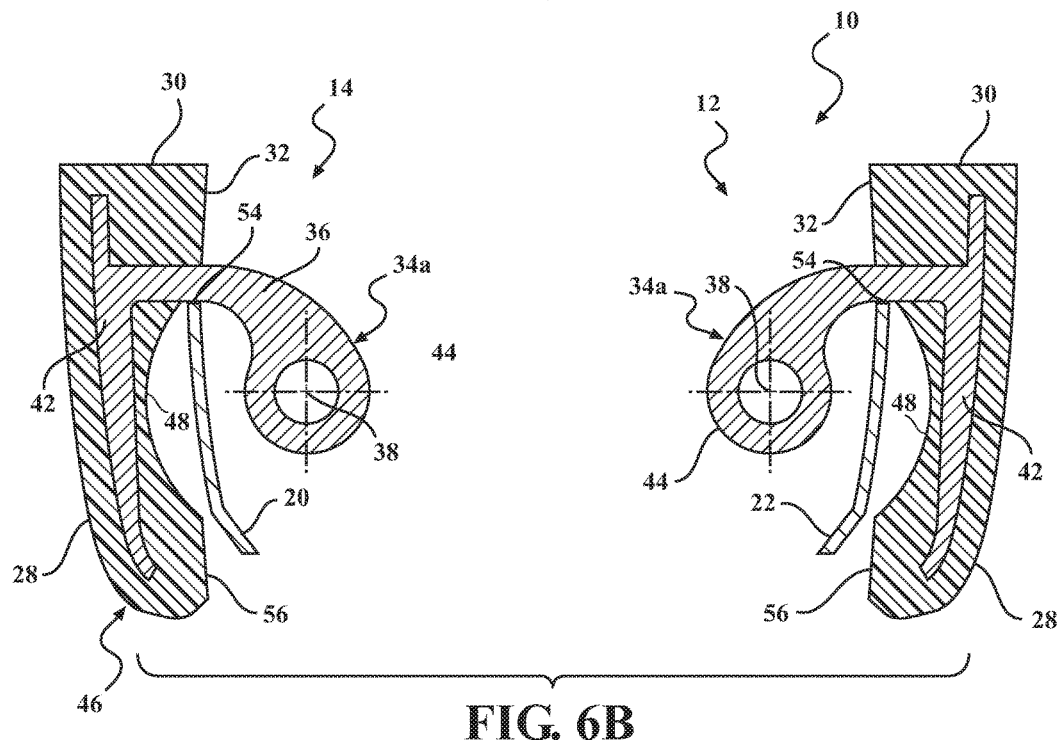
FIG. 6B is a partial cross-sectional view of the split center console taken along the line 6-6 of FIG. 4, representative of the split center console assembly being in an open position as shown in FIG. 2.

FIG. 6A is a partial cross-sectional view of the split center console taken along the line 6-6 of FIG. 4, with the split center console assembly 10 in a closed position. FIG. 6B is a partial cross-sectional view of the split center console taken along the line 6-6 of FIG. 4, representative of the split center console assembly 10 being in an open position, for example, as shown in FIG. 2. FIGS. 6A and 6B provide additional details with respect to the coordinated operation of the pivot hinges 34 and the lower surface 32 of armrests with the side walls 20, 22. Each pivot hinge 34 may define a pivot base region 44 and a pivot arm 36 extending from the pivot base region 44. In various aspects, the pivot arm 36 may be a curved arm, coupled to the base support member 42, or integrally formed with the base support member 42, as discussed above. The pivot base region 44 of each pivot hinge 34a, 34b may be movably coupled to the respective front end wall 16 and rear end wall 18. Because each pivot axis 38 is generally offset a distance (represented by dimension "D" of FIG. 7A) from the side walls 20, 22 in a direction toward the center of the storage compartment 24, and the hinges 34 include a pivot arm 36, the pivoting rotation of each armrest 12, 14 actually drops, or lowers, an end 46 of the respective armrest (comparing FIG. 6A with FIG. 6B), and results with the lower surface 32 of the armrests 12, 14 being immediately adjacent to the outer surfaces 20a, 22a of the side walls 20, 22. In this regard, the lower surfaces 32 of the armrests 12, 14 may be provided with a shaped recess 48 defined therein in order to spatially accommodate the pivoting rotational movement of the armrests 12, 14 with respect to the adjacent side walls 20, 22. In various aspects, the shaped recess 48 in the lower surface 32 may be defined with a substantially uniform radius of curvature, with dimensions based on the offset pivot axis 38 and height of the side walls 20, 22. Other shapes may also be contemplated, so long as they provide adequate clearance with respect to the side walls 20, 22. The base support member 42 may be provided with a variable thickness in order to provide adequate support for the armrest 12, 14 with a recess 48 in the lower surface 32. The base support member may also include thinner edge regions 50, 52, which may assist in shaping the exterior surfaces 28, 30, 32.

As shown in FIG. 6B, the upper surfaces 28 of the armrests 12, 14 are substantially parallel to the respective side walls 20, 22 when the split center console assembly 10 is in the open position. As discussed above, the armrests 12, 14 are also immediately adjacent to the side walls 20, 22, such that only minimal extra space is taken up adjacent the passengers. The pivot arms 36 may be provided with a stop portion 54 or region configured to serve as a stop means and to abut an upper surface 20b, 22b of the respective side walls when in the open position. In various aspects, suitable padding may be provided at the upper surfaces 20b, 22b. In the closed position of FIG. 6A, at least a portion 56 of the lower surface 32 may extend a distance outside of the storage compartment 24. It is also contemplated that biasing means may be provided (not shown) in order to assist an occupant in rotating the armrests to the open or closed positions.

With renewed reference to FIGS. 1 and 2, the console assembly of the present technology not only provides the availability of an armrest in both the closed and open positions of the console assembly, but in various aspects provides that the armrest support surface is at substantially the same height when the split center console assembly is in the respective closed and open positions. For example, FIG. 1 depicts the height of the armrest from the base to the upper support surface 28 as H1, and FIG. 2 depicts the height of the armrest from the base to the side edge support surface 30 as H2. In preferred aspects, H1 and H2 are equal, or substantially equal dimensions, where an occupant would not typically notice a difference in the support.

In various aspects, it may be desired for the pivot hinges 34 to be located such that they do not interfere with the interior space in the storage compartment 24. FIG. 7A is a top plan schematic view of the split center console assembly 10 in the open position, illustrating the location of the pivot hinges 34 according to a first aspect, being at least partially located within a recess 58 defined in each of the front end wall 16 and the rear end wall 18. In this regard, rotation of the armrests 12, 14 will generally not interfere with any objects placed in the storage compartment. FIG. 7B is a top plan schematic view of the split center console in the open position, illustrating the location of the pivot hinges according to a second aspect, where the pivot hinges 34 are coupled to an interior portion 60 of the front end wall 16 and interior portion 62 of the rear end wall 18.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc.

For purposes of this disclosure, the term "coupled" (and its variants) generally means the joining of two components directly or indirectly to one another. For example, the joining can be stationary in nature or movable in nature. The joining may be achieved with the two components, and any additional intermediate members or components being integrally formed as a single unitary body with one another or with the two components. Such joining may be permanent in nature or may be movable or releasable in nature, unless otherwise stated.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A split center console assembly for a vehicle, the split center console assembly comprising:
   a front end wall;
   a rear end wall;
   first and second opposing side walls;
   a storage compartment defined by the front end wall, the rear end wall, and the first and second opposing side walls;
   a split cover for selectively providing access to the storage compartment, the split cover including a pivoting driver armrest and a pivoting passenger armrest, each armrest comprising:
      an upper support surface configured to provide arm support when the split center console assembly is in a closed position;
      a side edge support surface configured to provide an arm support when the split center console assembly is in an open position;
      a lower surface defining a shaped recess to accommodate rotational movement of each armrest with respect to an adjacent side wall; and
      at least one pivot hinge defining an arm portion extending a distance from a pivot axis and configured to pivotally couple the respective armrest to the storage compartment,
      wherein a pivoting rotation of each armrest lowers an end of each armrest such that the lower surface of each armrest is disposed adjacent the respective first and second opposing side walls.

2. The split center console assembly according to claim 1, wherein the pivot hinge comprises a curved arm portion coupling each armrest to an end wall of the storage compartment, the pivot axis being offset a distance from the side walls.

3. The split center console assembly according to claim 2, wherein each armrest comprises a pair of pivot hinges coupled to the respective front end wall and rear end wall of the storage compartment.

4. The split center console assembly according to claim 2, wherein the pivot hinges are at least partially located within recesses defined in the respective front end wall and rear end wall.

5. The split center console assembly according to claim 1, further comprising a base support member coupled to each of the driver armrest and the passenger armrest.

6. The split center console assembly according to claim 5, wherein the respective base support members are encapsulated within the driver armrest and the passenger armrest.

7. The split center console assembly according to claim 5, wherein the base support member is integrally formed with the at least one pivot hinge as a monolithic component.

8. The split center console assembly according to claim 1, wherein the shaped recess in the lower surface of each armrest is defined by a radius of curvature.

9. The split center console assembly according to claim 1, wherein the arm support from the upper support surface and the arm support from the side edge support surface is provided at substantially the same height when the split center console assembly is in the respective closed and open positions.

10. The split center console assembly according to claim 1, wherein an edge of the arm portion of the pivot hinge defines a rest stop configured to abut against an upper edge of a respective side wall in the open position.

11. The split center console assembly according to claim 1, wherein the upper support surfaces of the armrests are substantially parallel to the respective side walls when the split center console is in the open position.

12. The split center console assembly according to claim 1, wherein each armrest defines a grip portion configured for grasping and rotating the armrest between the closed and open positions.

13. A split center console assembly for a vehicle providing equal armrest heights in open and closed positions, the split center console assembly comprising:
   a front end wall;
   a rear end wall;
   first and second opposing side walls;
   a storage compartment defined by the front end wall, the rear end wall, and the first and second opposing side walls;
   a split cover for selectively providing access to the storage compartment, the split cover including a pivoting driver armrest and a pivoting passenger armrest, each armrest comprising:
      an upper support surface configured to provide arm support when the split center console assembly is in a closed position;
      a side edge support surface configured to provide an arm support when the split center console assembly is in an open position;
      a lower surface defining a shaped recess to accommodate rotational movement of each armrest with respect to an adjacent side wall;
      a base support member; and
      a pair of spaced apart pivot hinges coupled to the base support member, the pivot hinges configured to pivotally couple the armrest to the respective front end wall and the rear end wall storage compartment,
   wherein the arm support from the upper support surface and the arm support from the side edge support surface is provided at substantially the same height when the split center console assembly is in the respective closed and open positions,
   further wherein a pivoting rotation of each armrest lowers an end of each armrest such that the lower surface of each armrest is disposed adjacent the respective first and second opposing side walls.

14. The split center console assembly according to claim 13, wherein the pivot hinges are at least partially located within recesses defined in the respective front and rear end walls, and the pivot hinges rotate about pivot axes that are offset a distance from the side walls.

15. The split center console assembly according to claim 13, wherein the base support member is integrally formed with the pair of pivot hinges as a monolithic component.

16. The split center console assembly according to claim 13, wherein the shaped recess in the lower surface of each armrest is defined by a radius of curvature.

\* \* \* \* \*